United States Patent [19]

Oppenheim et al.

[11] 4,040,362
[45] Aug. 9, 1977

[54] RAILWAY BOLSTER INTEGRAL WEAR LINER

[75] Inventors: Carl Emil Oppenheim, West Dundee, Ill.; James McKenna, Atlanta, Ga.

[73] Assignee: Chemetron Corporation, Chicago, Ill.

[21] Appl. No.: 727,778

[22] Filed: Sept. 29, 1976

Related U.S. Application Data

[60] Continuation of Ser. No. 517,680, Oct. 24, 1974, abandoned, which is a division of Ser. No. 406,678, Oct. 15, 1973, Pat. No. 3,894,676.

[51] Int. Cl.² .................. B61F 5/16; C22C 39/20; C22C 39/26; F16C 17/10
[52] U.S. Cl. ................... 105/226; 75/126 B; 75/126 C; 105/199 C; 219/76; 308/137
[58] Field of Search ............ 29/401; 75/126 B, 126 C; 105/199 C, 226, 227, 228, 229, 230; 219/73 A, 73 R, 76, 146; 228/164, 173, 125, 182; 308/136, 137

[56] References Cited

U.S. PATENT DOCUMENTS

| | | | |
|---|---|---|---|
| 1,770,982 | 7/1930 | Jacobs | 308/137 |
| 1,900,682 | 3/1933 | Alcott | 29/401 |
| 2,078,176 | 4/1937 | Hartwig | 308/137 |
| 2,148,427 | 2/1939 | Howard et al. | 228/173 |
| 2,169,354 | 8/1939 | Chace | 228/175 |
| 2,254,831 | 9/1941 | Shaffer | 105/226 |
| 2,348,694 | 5/1944 | Delkers | 105/226 |
| 3,326,611 | 6/1967 | Christian | 308/137 |
| 3,599,574 | 8/1971 | Robertson | 105/199 C |
| 3,600,161 | 8/1971 | Inouye et al. | 75/126 C X |
| 3,771,465 | 11/1973 | Glenn | 308/137 X |
| 3,829,049 | 8/1974 | Hughes et al. | 228/164 X |
| 3,894,676 | 7/1975 | Oppenheim et al. | 228/182 |

Primary Examiner—Robert J. Spar
Assistant Examiner—Howard Beltran
Attorney, Agent, or Firm—N. M. Esser

[57] ABSTRACT

A railway bolster is provided wherein the bolster bowl and king bolt openings have liners of low alloy or carbon steel backed by a weld metal deposit with a hardness of from about 25 to 40 Rockwell C the weld metal forming the wear element.

5 Claims, 3 Drawing Figures

RAILWAY BOLSTER INTEGRAL WEAR LINER

This application is a continuation of application Ser. No. 517,680, filed Oct. 24, 1974, now abandoned, which was a division of application Ser. No. 406,678, filed Oct. 15, 1973, now U.S. Pat. No. 3,894,676, dated July 15, 1976.

BACKGROUND OF THE INVENTION

The increased size of railway cars and the higher speeds at which they have been operated aggravates the wear on the bearing portion of the truck bolsters which have a hardness of about 8 to about 10 Rockwell C. Structures including a hardened liner for the bolster bowl have been proposed, but fitting the liner to the bolster and securing it in place has been a problem. Finishing the interior of the bolster bowl with a deposit of hard weld metal provides a satisfactory bond to the bolster body, but the deposited metal must be ground to provide a bearing surface; this process requires 12 to 16 hours per bolster. Moreover, the weld metal is conventionally deposited in the down hand position, a practice which requires frequent repositioning of the bolster in a vertical plane. Attempts to develop a smoother surface by depositing the weld metal against a removable form, e.g., of carbon, were unsuccessful.

There remains, therefore, a need for a method of manufacturing and reconstructing bolsters which is more easily practiced, is economically attractive and provides a bolster with a satisfactory or superior working life.

THE INVENTION

It is an object of the invention to provide a railway car bolster having a bolster bowl and a kingpin opening which furnish excellent wearing qualities and which can be inexpensively fabricated. It is a further object of the invention provide to provide a method of surfacing bolster bowls and/or kingpin openings which is applicable to newly constructed bolsters or in restoring worn bolsters to a useful life. A still further object is the provision of a method which enables a bolster to be processed in the horizontal position.

These and other objects of the invention are achieved through the provision of a railway car bolster including an upwardly opening bolster bowl comprising an upstanding flange, a liner having top and bottom edges within said flange and defining a generally cylindrical sidewall within said bowl, and a body of alloy weld metal encircling said liner, the weld metal being deposited between the liner and the flange to form the wear element or bearing surface for the bolster. The body of weld metal extends substantially continuously between said top and bottom edges of the liner and secures the liner to the flange. The body of weld metal is preferably larger adjacent the top edge than at the bottom edge and both top and bottom are thicker than the liner.

In one embodiment the liner is formed from carbon steel having a thickness of about 10-gage and having a chemical composition falling between 1020 and 1050 or from a low alloy steel having a composition falling between 4130 and 4340 as noted below.

|      | % (by Wt.) Carbon Range | % Mn. Range | % Phos. Max. | % Sulphur Max. |
|------|-------------------------|-------------|--------------|----------------|
| 1020 | .15 – .25               | .30 – .60   | .045         | .055           |
| 1050 | .45 – .55               | .60 – .90   | .045         | .055           |
| 4130 | .25 – .35               | .50 – .80   | .040         | .050           |

-continued

|      | % (by Wt.) Carbon Range | % Mn. Range | % Chromium .50 – .80 % Phos. Max. | % Moly .15 – .25 % Sulphur Max. |
|------|-------------------------|-------------|-----------------------------------|----------------------------------|
| 4340 | .35 – .45               | .50 – .80   | .040                              | .050                             |
|      |                         |             | % Chromium                        | % Ni Range                       | % Moly |

| % Chromium | % Ni Range | % Moly |
|------------|------------|--------|
| .50 – .80  | 1.50 – 2.0 | .30 – .40 |

The body of weld metal has the following composition.

Carbon — from about 0.08 to about 0.15% by weight
Manganese — from about 1.0 to about 1.75% by weight
Chromium — from about 2.0 to about 2.5% by weight
Molybdenum — from about 0.4 to about 0.65% by weight
Silicon — about 0.60 Maxium % by weight
Iron — Balance The body of weld metal desirably has a hardness of from about 25 to about 40 Rockwell C. The large amount of wear resistant weld metal extending from the top of the built up joint down to the root serves to give much longer life to this very important part of the total bolster. It especially counteracts the upsetting or flow of metal common to the impacting of any force to an edge of this kind. Thus, there is formed a bolster bowl having three concentric rings welded into a single body comprising a relatively thin central liner of low alloy or carbon steel, an encircling and thicker ring of hard weld metal and, outermost, the bolster bowl flange. The mass of the deposited body of weld metal is greater than the mass of the liner ring and forms the wear element of the bolster bowl after the liner ring has worn away.

The invention also includes the method of constructing a railway car bolster having an upwardly facing bolster bowl comprising the steps of forming the bowl with a flange having a top with an inside diameter larger than the inside diameter of the flange bottom, securing a liner having a generally cylindrical wall within said bowl and depositing weld metal, preferably with an electric arc, to fill the space between the liner and the flange. Usually the top and bottom edges of the cylindrical liner are substantially aligned with the top and bottom edges, respectively, of the flange.

In one embodiment the method includes the step of making at least one pass of the weld metal with an electrode having a small diameter, about 0.045 to about 0.065 inch; desirably, succeeding passes are made with electrodes having a diameter larger than about 0.065 inch.

The step of depositing of the weld metal includes shielding the welding operation with a gas having a major percentage of argon. Desirably, the shielding gas comprises oxygen in the amount of from about 2 to about 5%. Alternatively, the shielding gas may comprise carbon dioxide in the amount of from about 10 to about 25%. After welding, the bolster, liner, and weld metal body may be heat treated at a temperature of 1150° for about 1 hour.

The invention will be better understood from references to the following drawings which illustrate an embodiment of the invention and wherein.

Figure 1:
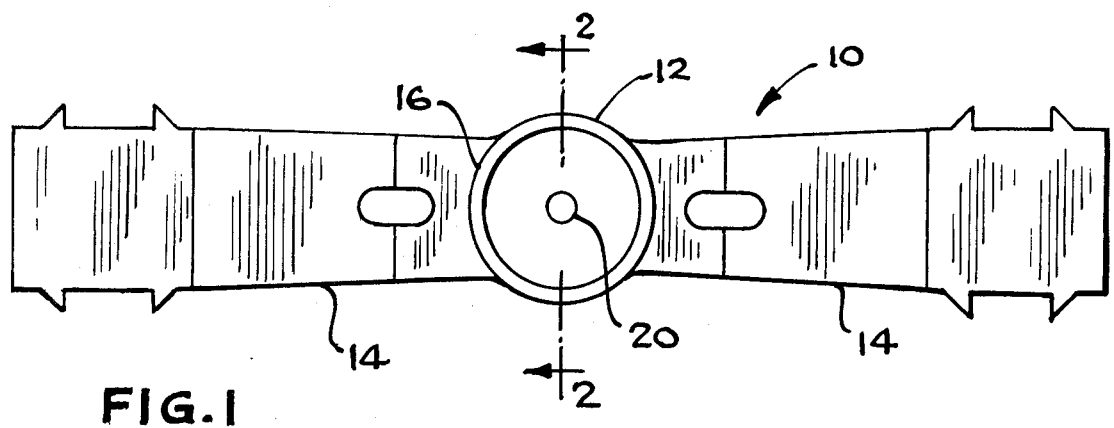
FIG. 1 is a top view of a bolster having a center bearing.

In FIG. 1 there is illustrated a truck bolster 10 which is a unitary casting and includes a large center section 12 and tapered arms 14 extending therefrom. Cast integrally with the enlarged center section 12 on its upper surface is an upstanding flange 16 which forms the periphery of an upwardly extending bolster bowl of shallow depth. A central bore 20 is provided to accept the kingpin, not shown, extending from the car underframe.

Figure 2:
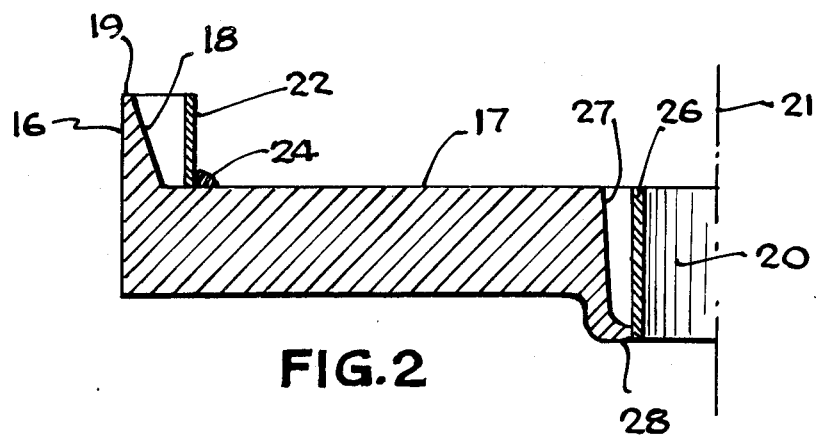
FIG. 2 is a sectional view of the bolster taken on the section lines 2—2 of FIG. 1 and shows the bolster prepared for metal deposit; and, FIG. 3 shows the completed bolster in a sectional view similar to FIG. 2 with the metal deposited.

FIG. 2 presents an enlarged sectional view taken through the midpoint of the bolster of FIG. 1 and illustrates the bolster bowl having an upstanding flange 16 and the bowl bottom 17. The inside of the flange is chamfered at 18 over substantially its entire height by flame cutting or machining to provide a resevoir for weld metal. The chamfering is controlled to provide a narrow top edge 19 which is about ⅛ inch wide. Where the section of the flange 16 is sufficiently wide, the chamfer 18 is preferably at an angle of about 45°.

After all loose residue and slag from the flame cutting operation are removed and the prepared bowl is clean, a bolster liner ring 22 which may have an inside diameter of about 14 inches and a height of 1⅛ to 1⅜ inches is positioned coaxially with the bore center line 21 and located with a tack weld 24. About six tacks equally spaced are adequate. The liner rings are rolled from 10-gage carbon steel of a composition between 1020 and 1050, or of low alloy steel having a composition between 4130 and 4340.

A liner 26 of like material may be inserted in the bore 20 for the kingpin as illustrated in FIG. 2. The wall 27 is recessed and the liner is a press fit within seat 28.

With liner rings 22 and/or 26 in place, the heavy center portion of the bolster casting is preheated to 150° F. if of Grade 'B' cast steel; 250° F. if Grade 'C' cast steel. This reduces the possibility of cracking.

Figure 3:
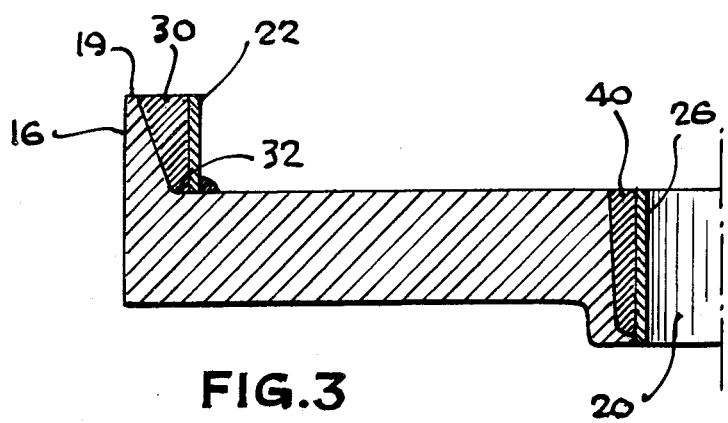

The bolster is arranged in a horizontal position with the bowl facing up. To the prepared bolster bowl the bodies of weld metal 30 and 40 as shown in FIG. 3 are added using a fluxless tubular alloy electrode having a sheath of mild steel and a filler of approximately the following composition: ferromolybdenum, about 4.5%; ferrochromium, about 17%; ferrosilicon, about 6%; ferromanganese, about 13%; iron powder, about 59.5%. The filler comprises approximately 18% by weight of the finished electrode. The metal is deposited with an electric arc and with a shielding gas mixture containing 98% argon and 2% oxygen by volume. The first metal deposited at the apex 32 is laid down in a fast pass with a wire of about 1/16 inch in diameter and after the body 30 has built up to an appreciable extent, a larger wire such as 5/64 or 3/32 in diameter is employed.

Similarly, a body of weld metal 40 is built up at the bore 20. The entire bolster then is heat treated at a temperature of about 1150° F. for 1 hour to relieve the stress built up in the welding process.

With automatic water-cooled equipment such as Chemetron gun model AM-21 or A-11, the weld metal is deposited in about 2 hours. The ring 22 and liner 26 require no additional finishing before the bolster is placed in service.

The analysis of the metal deposited with a shielding gas of 98% argon and 2% oxygen is shown in column 1 of Table I.

The process can likewise be performed with other gases, for example, 95% argon, 5% oxygen and argon-carbon dioxide mixtures containing from about 10 to about 25% carbon dioxide by volume. Analysis of metal deposited with such mixtures is shown in columns 2 and 3 in Table I. Carbon dioxide may be used as the shielding gas, but when this is done, the electrode should contain larger percentages of manganese and chromium.

TABLE I

| | WELD METAL DEPOSIT | | |
|---|---|---|---|
| | 98%A—2%O$_2$ | 95%A—5%O$_2$ | 75%A—25%CO$_2$ |
| % C By weight | 0.12 | 0.12 | 0.12 |
| % Mn | 1.52 | 1.51 | 1.55 |
| % Si | 0.36 | 0.35 | 0.31 |
| % Cr | 2.11 | 2.10 | 2.09 |
| % Mo | 0.56 | 0.55 | 0.55 |
| Iron | Balance | Balance | Balance |
| Hardness As Welded[1] | 38.2R$_c$ | 33.2R$_c$ | 24.2R$_c$ |
| Hardness Stress Rel.[1] | 26.1R$_c$ | 25.3R$_c$ | 18.5R$_c$ |

[1]Average of five readings.

While the invention has been explained with reference to reconstructing bolsters including preparation of the interior of the bowl, it will be apparent to those skilled in the art that new bolsters prepared with a flange cast as shown in FIG. 2 might suitably be provided with a liner and hard metal alloy deposit as described above.

While the foregoing invention has been described with respect to specific embodiments, it will be understood that substitutions and modifications may be made and all such of these as come within the spirit of this invention are included within its scope as defined by the appended claims.

We claim:

1. A railway car bolster including an upwardly opening bolster bowl comprising an upstanding flange, a wearable steel liner having top and bottom edges within said flange and defining a generally cylindrical metal receiving void between said upstanding flange and said liner, and a body of alloy weld metal disposed within said void and bonded to said flange and said liner, said body of weld metal having a greater hardness than said liner, extending substantially continuously between said top and bottom edges of said liner and forming a wear element for said flange.

2. A bolster according to claim 1 wherein the body of weld metal is larger adjacent the top edge than at the bottom edge of said liner and has a mass greater than the mass of said liner.

3. A bolster according to claim 1 wherein the liner is formed from a sheet steel material having a carbon content in the range of about 0.15–0.55% by weight, a manganese content in the range of about 0.30–0.90% by weight, a maximum phosphorous content of 0.045% by weight, and a maximum sulphur content of 0.055% by weight.

4. A bolster according to claim 1 wherein the liner is formed from a sheet steel material having, by weight, a carbon content in the range of 0.25–0.45%, a manganese content in the range of 0.50–0.80%, a maximum phosphorous content of 0.040%, a maximum sulphur content of 0.050, a chromium content in the range of 0.50–0.80%, a molybdenum content in the range of 0.15–0.40%, and a nickel content up to about 2%.

5. The bolster of claim 1 wherein the body of alloy weld metal has the following composition:

Carbon — from about 0.08 to about 0.15% by weight
Manganese — from about 1.0 to about 1.75% by weight
Chromium — from about 2.0 to about 2.5% by weight
Molybdenum — from about 0.4 to about 0.65% by weight
Silicon — about 0.60 Maximum % by weight
Iron — Balance

* * * * *